3,544,517
AMINO-ETHYLATED NOVOLAKS AS CURING
AGENTS FOR EPOXY RESINS
Thaddeus Muzyczko, Melrose Park, Samuel Shore,
Roselle, and Jerome A. Martin, La Grange Park, Ill.,
assignors to The Richardson Company, Melrose Park,
Ill., a corporation of Ohio
No Drawing. Continuation-in-part of application Ser. No.
591,985, Nov. 4, 1966. This application June 9, 1969,
Ser. No. 831,742
Int. Cl. C08g 30/14
U.S. Cl. 260—47         8 Claims

ABSTRACT OF THE DISCLOSURE

The invention is directed to a process of producing cured epoxy resins using amino-ethylated novolaks. The cured products are useful as molded articles, coatings and other purposes characteristic of epoxy resins.

CROSS REFERENCES

This application is a continuation-in-part of our copending application S.N. 591,985 filed Nov. 4, 1966, which has issued Aug. 12, 1969 as U.S. 3,461,099.

BACKGROUND

This invention relates to epoxy resins and more particularly to the preparation of cured epoxy resins using amino-ethylated novolaks.

Epoxy resins which can be cured to infusible or cured resins, are characterized as polyepoxide resins or resin-forming systems. Polyepoxides are characterized by the presence of a plurality of epoxy groups

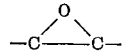

sometimes referred to as "oxirane groups." Polyepoxides can be aliphatic, aromatic, cycloaliphatic or heterocyclic and can contain substituents, such as hydroxyl groups or halogen atoms, etc. Many epoxies currently in use are polyglycidal ethers obtained by the reaction of epichlorohydrin with a polyhydric compound in an alkaline medium. These polyhydric compounds can be polyhydric alcohols or polyhydric phenols. Polyhydric alcohols, which can be reacted with epichlorohydrin, for example, to produce polyglycidyl ethers are exemplified by glycerol, propylene glycol, butylene glycol, sorbitol, mannitol and the like. Polyhydric phenols are exemplified by phenol, resorcinol and bisphenols, such as 2,2-bis(4-hydroxyphenyl) propane. Additionally, epoxylated novolaks have gained some acceptance, these compounds being obtainable by reacting epichlorohydrin in an alkaline medium with fusible phenol-formaldehyde condensation products.

Additional polyepoxides capable of being cured to a hard, infusible state are those obtained through the peracetic acid route and are exemplified by dicyclopentadiene diepoxide and epoxidized triglycerides, such as epoxidized soybean oil.

For further disclosure of the various types of epoxy resin or resin-forming compounds, reference is made to numerous examples referred to in the patents to Shokal 2,915,485 and Schroeder 2,903,381. Additionally, the publications by Skeist, "Epoxy Resins," 1958, also can be referred to for a disclosure of various useful epoxy resins.

The above uncured epoxy resins are converted to cured infusible products by a process involving the use of curing conditions and a curing agent. The resultant cured epoxy resins are useful for a variety of industrial products.

SUMMARY

Briefly, the invention involves a process for preparing cured epoxy resins by heating an uncured epoxy resin under curing conditions with an amino-ethylated novolak. Sufficient amount of the amino-ethylated novolak is used to provide the desired cure. The invention also involves the resultant cured epoxy resin, which has good heat distortion properties.

DETAILED DESCRIPTION

The process of the invention utilizes an amino-ethylated novolak which is the reaction product of a novolak and an imine. As described in our copending application S.N. 591,985, the imine has the formula

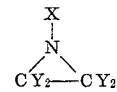

wherein X and Y are each selected from the group consisting of hydrogen, alkyl, aryl and mixtures thereof.

The resultant amine reaction product is used as a curing agent in the conversion of uncured epoxy resins to cured products. The process comprises heating at an elevated temperature the uncured epoxy resin with an amount of the amine reaction product sufficient under curing conditions to convert the uncured resin to the cured resin. Advantageously, the curing agent is present in an amount of at least 2 percent by weight in order to effectively produce the desired cure and necessary resistance to heat distortion. However, usually the particular epoxy resin and the number of epoxy groups in the resin and the particular amine reaction product determine the amount of curing agent for particularly useful results. In general, the preferred amount of the curing agent is in the range of from about 5–50 percent by weight based on the weight of uncured resin plus curing agent.

Conditions of cure are generally dependent on the particular epoxy resin and amine reaction product. Room temperature cures can be conveniently accomplished with amine products from ethylene imine and with times of cure similar to those for other polyamine curing agents. Higher temperature cures are often utilized and under these conditions, the resin and curing agent are heated to 100–300° F. (38°–149° C.) and more usually about 150–250° F. (66°–121° C.) for a time sufficient to provide the desired cure. A time of about 1–6 hours is usually sufficient for this purpose.

The curing agent useful in the process of the invention is an amine reaction product of a novolak and the above defined imine. It is further characterized by low volatility and is therefore very useful where elevated temperatures of cure are utilized.

Novolaks are well known in the phenolic resin field and are described in Phenolic Resins by David F. Gould, copyright 1959, as a premanently fusible condensation product obtained in an acid medium by reacting an aldehyde such as formaldehyde with a molar excess of a phenolic compound such as phenol, cresols, xylenols, nonylphenols, and the like. The resultant novolak is characterized by a plurality of phenolic OH groups and solubility in common solvents. Of particular interest to this invention are novolaks with molecular weights in the range of about 300 to 2000 and advantageously about 1200 to 1500 and more particularly modified or oil soluble novolaks. Although not essential, it is usually advantageous when the novolak has little, if any, hydroxy methyl groups.

The above-described imine has the formula:

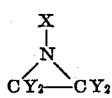

wherein X and Y are as described above. Advantageously, Y is hydrogen or alkyl as represented by such imines as ethylene imine, monoalkyl ethylene imine, dialkyl ethylene imine, trialkyl ethylene imine, and tetraalkyl ethylene imine. Also advantageously, X is hydrogen or alkyl. Illustrative alkyls are the lower alkyls with 1–5 carbon atoms which may be completely hydrocarbon or may contain hydroxy, alkoxy, or chloro groups. Advantageously, they are primarily hydrocarbons devoid of groups which cause competing reactions, and include the aryl alkylenes such as phenyl ethylene as well as the alkyls such as methyl, ethyl, propyl, butyl, pentyl, and the like. Ethylene imine and the monoalkyl and dialkyl imines are preferred.

The reaction to produce the amine reaction product is carried out with the imine and novolak in amounts to produce a product with the desired amine functionality. Usually, a weight ratio of imine to novolak of at least about 1:1 is utilized although about 1:5 to 3:1 and advantageous about 1:1 to 3:1 provides products with very useful properties. In the reaction, the temperature is somewhat dependent on the particular imine although in general, a temperature of about 100–150° C. provides very satisfactory results.

Solvents such as benzene, toluene or other aromatic solvents, or aliphatic or chlorinated solvents can be used in the reaction medium. With a reaction utilizing propylene imine and a solvent such as toluene, the product remains dissolved in the solvent. Vacuum stripping can be subsequently used to further isolate the product.

The reaction results in the formation of products characterized by:

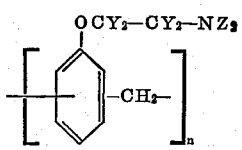

wherein Y is as described above, $n$ is an integer above 1, and one Z represents hydrogen, the groups previously defined with respect to X, or the substituted products when additional imine reacts with available hydrogen on the amino group. Since the other Z is initially hydrogen from the phenolic OH, it represents hydrogen or a substituted product. In these products, it is not uncommon to have primary, secondary and tertiary amines in the aromatic polymer as well as residual co-reactive phenol groups.

The following examples illustrate some of the embodiments of this invention. It is to be understood that these are for illustrative purposes only and do not purport to be wholly definitive to conditions or scope.

Example I

A one liter, three neck, round bottom reaction flask was fitted with a water cooled reflux condenser, thermometer and dropping funnel. Agitation was supplied with a motor driven paddle agitator. The flask was charged with 64.0 grams of novolak resin (molecular weight= 1200–1500) and 300.0 grams of toluene. This mixture was heated with an electric heating mantle until the resin was completely dissolved (70° C.—1 hour). A solution of 69.0 grams of propylene imine in 100.0 grams of toluene was added via a dropping funnel at 50 to 105° C. over a one hour period. The equivalent ratio of imine to novolak was approximately 2:1.

This reaction solution was refluxed for 30 hours, after which the unreacted propylene imine and toluene were removed by vacuum distillation (115° C. at 20 mm. Hg). The residue was an amber brittle, tacky resin which was dissolved in petroleum ether (300 ml.) and washed with distilled water until the aqueous phase was neutral, to remove any by-product imine homopolymers. The petroleum ether solution was concentrated on a steam bath and further dried in a vacuum oven to constant weight.

The product was not soluble in water but was soluble in dilute HCl, dilute $H_2SO_4$ and acetone. Analyses showed: 8.20% N, 40.0% primary amine, 41.3% secondary amine, 18.7% tertiary amine by weight. Infrared showed a characteristic ether absorption at 1110 cm.$^{-1}$ and, a loss of original phenolic OH obsorptions at 3300 cm.$^{-1}$. The softening point of this amber resin was 37–40° C.

Example II

About 15.0 grams of a bisphenol-A, epichlorohydrin epoxy resin (avg. equiv. wt.=190) available as Epon 828 from Shell Chemical Company and 5.0 grams of product of Example I were mixed in an aluminum planchet at 60° C. and formed a solution. This solution was then cured in a 100° C. oven for six hours. The resultant casting was a hard clear amber resin that was not tacky and had a Barcol hardness of 60.

Example III

A one liter flask with stirrer, thermometer, dropping funnel and condenser was charged with about 106 grams of an oil-soluble novolak resin and about 300 grams of toluene. A clear red-brown solution was formed. The solution was warmed to about 53° C. and a solution of ethylene imine (about 86 grams or 2 moles) in toluene (about 100 grams) was added dropwise over a 77 minute period. During the addition, an exotherm caused the temperature to increase to a maximum of about 64° C. after which the remaining 50% of the imine was added. The solution was then refluxed for about 5 hours after which about 280 ml. of distillate was removed under atmospheric pressure and the remainder was removed at about 0.1 mm. Hg at 135° C. A total of about 189.7 grams of soft, clear, brown resin was obtained (98.8% yield).

Analyses of the resinous product indicated the following: 0.89 meg./gram of primary amine, 7.36 meg./gram of secondary amine, 1.61 meg./gram of tertiary amine, and an active amino hydrogen equivalent weight of 110.

Test bars were prepared by blending a solution of about 17.2 parts by weight of the above resinous product and about 3.4 parts by weight of dibutyl phthalate with about 29.4 parts by weight of a bisphenol-A, epichlorohydrin epoxy resin (avg. equiv. wt.=190) available as Epon 828 from Shell Chemical Company. These test bars were cured at room temperature (25° C.) for about 18 hours and then at 300° F. for about 3 hours to insure complete curing. The resultant products were identified as product B.

For comparison purposes, test bars were prepared in identical fashion from the above epoxy resin (29.4 parts by wt.), triethylene tetramine (3.9 parts by wt.) as the curing agent, and dibutyl phthalate (3.4 parts by wt.). After curing, the products were identified as product C.

Tests on Products B and C revealed the following:

TABLE I

| Test | Product, °F | |
|---|---|---|
| | B | C |
| Heat distortion of (ASTM-D-648-56) | 179 | 157 |
| Barcol hardness | 52 | 50 |

The above results demonstrate that an improved heat distortion temperature of 179° F. and a very satisfactory hardness value of 52 were obtained for the imine-novolak product.

While the invention has been described in conjunction with a specific example thereof, this is illustrative only. Accordingly, many alternatives, modification, and variations will be apparent to those skilled in the art in the light of the foregoing description, and it is therefore intended to embrace all such alternatives, modification, and variations as to fall within the spirit and broad scope of the appended claims.

We claim:
1. A process for preparing cured epoxy resins which process comprises heating an uncured epoxy resin having a plurality of oxirane groups with at least 2 percent by weight of an amine reaction product of a novolak having a plurality of phenolic OH groups and an imine with the formula

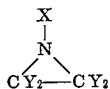

wherein X and Y are each selected from the group consisting of hydrogen, alkyl, aryl and mixtures thereof, the imine being present in an equivalent ratio to the novolak of at least 1:5 based on the phenolic OH content of the novolak, said heating being carried out under curing conditions to convert said uncured resin to said cured resin.

2. The process of claim 1 wherein said amine is present in from about 2 to about 50 percent by weight based on said uncured resin plus amine.

3. The process of claim 1 wherein said uncured epoxy resin is a polyglycidyl ether of a polyhydroxy phenol, said amine reaction product is based on an equivalent ratio of imine to novolak of about 1:5 to 3:1 based on the phenolic OH content of the novolak, and said amine is present in from about 5 to about 50 percent by weight of said uncured resin plus amine.

4. The process of claim 1 wherein at least one Y of the imine is hydrogen and the remaining Y's are alkyl.

5. The process of claim 4 wherein X of the imine is hydrogen.

6. The process of claim 1 wherein the imine and novolak are present in the range of about 1:1 to 3:1 based on the phenolic OH content of the novolak.

7. A hard infusible epoxy resin produced by the process of claim 1.

8. The epoxy resin of claim 7 wherein the uncured epoxy resin is a polyglycidyl ether of a polyhydroxyl phenol and the amine reaction product is based on an imine wherein X and at least one Y are hydrogen and the remaining Y's are alkyl.

References Cited
UNITED STATES PATENTS 3,329,737   7/1967   Smith _____ 260—831

WILLIAM H. SHORT, Primary Examiner

T. E. PERTILLA, Assistant Examiner

U.S. Cl. X.R.
117—161; 260—18, 59